United States Patent
Kosuge et al.

(10) Patent No.: US 6,868,354 B2
(45) Date of Patent: Mar. 15, 2005

(54) METHOD OF DETECTING A PATTERN AND AN APPARATUS THEREOF

(75) Inventors: Shogo Kosuge, Tachikawa (JP); Masaru Nogami, Kodaira (JP); Kiyoshi Iyori, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 0 days.

(21) Appl. No.: 10/715,444

(22) Filed: Nov. 19, 2003

(65) Prior Publication Data

US 2004/0111230 A1 Jun. 10, 2004

(30) Foreign Application Priority Data

Nov. 21, 2002 (JP) ........................................ 2002-337503

(51) Int. Cl.⁷ ............................ G01C 17/38; G01P 21/00
(52) U.S. Cl. ....................................................... 702/94
(58) Field of Search ..................... 702/94, 95, 150–153; 356/614, 620; 382/141, 144, 151

(56) References Cited

U.S. PATENT DOCUMENTS

| | | | | |
|---|---|---|---|---|
| 6,538,260 | B1 * | 3/2003 | Koga | ......................... 250/548 |
| 6,571,196 | B2 | 5/2003 | Kosuge | |
| 2001/0002462 | A1 * | 5/2001 | Kosuge | ....................... 702/167 |
| 2001/0007498 | A1 * | 7/2001 | Arai et al. | ................... 356/401 |
| 2002/0105648 | A1 * | 8/2002 | Nara et al. | ................... 356/394 |
| 2002/0164077 | A1 * | 11/2002 | Lee et al. | ..................... 382/224 |
| 2003/0138709 | A1 * | 7/2003 | Burbank et al. | .............. 430/22 |
| 2003/0174330 | A1 * | 9/2003 | Tanaka et al. | .............. 356/401 |

FOREIGN PATENT DOCUMENTS

| | | |
|---|---|---|
| JP | A-8-222611 | 8/1996 |
| JP | A-9-36202 | 2/1997 |

* cited by examiner

Primary Examiner—John Barlow
Assistant Examiner—Demetrius Pretlow
(74) Attorney, Agent, or Firm—Antonelli, Terry, Stout & Kraus, LLP

(57) ABSTRACT

An alignment mark is sometimes undetectable even when part of it is visible with the eye. There is provided a pattern detecting method and an apparatus capable of detecting the alignment mark if part of it is visible. Thereby a position of the alignment mark can be detected. An image of a substantially whole of the alignment mark is registered as a representative image and besides at least one image of a part of the registered representative image is newly registered as a partial image. When any one of the registered representative image and the partial image is recognized. The pattern based on the alignment mark is detected. Thereby position coordinates can be recognized.

15 Claims, 8 Drawing Sheets

(UNIT:mm)

(UNIT:mm)

(UNIT:mm)

(UNIT:mm)

LUMINANCE-PIXEL CHARACTERISTIC

METHOD OF DETECTING A PATTERN AND AN APPARATUS THEREOF

CROSS-REFERENCE TO RELATED APPLICATIONS

This invention relates to U.S. Pat. No. 6,571,196 (U.S. application Ser. No. 09/725,243) filed on Nov. 29, 2000 in the name of Shogo Kosuge and entitled "Size inspection/measurement method and size inspection/measurement apparatus", and U.S. application Ser. No. 10/082,120 filed on Feb. 26, 2002 in the name of Shogo Kosuge end entitled "Critical Dimension Measurement Method and Apparatus Capable of Measurement Below the Resolution of an Optical Micro Scope".

BACKGROUND OF THE INVENTION

1. Field of the Invention

The present invention relates to inspection apparatus such as line width measuring apparatus and more particularly, to a method of recognizing, for example, inspection reference positions on a subject to be inspected such as a substrate and an inspection apparatus using the method.

2. Description of the Related Art

FIG. 3 is a block diagram showing an example of construction of a line width measuring apparatus.

A line width measuring apparatus, which measures a width or a gap in a thin-film or a thin-film pattern formed on a substrate, and an inspection apparatus, which inspects a defect or a scratch on a substrate, are required to detect the error before starting an inspection, because an individual substrate as an inspection object has a dimensional error or a tolerance in a pattern formation, respectively.

To resolve above problem, the line width measuring apparatus or the inspection apparatus recognizes a reference pattern, for example, such as alignment mark on a substrate as an inspection object, the reference pattern is produced as same process as the measured pattern at the same time. And then, an inspection position to the reference position in the apparatus which recognized the reference position is corrected. Thereby, if an error in a substrate occurs, a normal inspection is conducted.

A technique as above is disclosed in, for example, JP-A-8-222611 (see pages 5 and 6 and FIG. 1) and JP-A-9-36202.

SUMMARY OF THE INVENTION

FIGS. 5A to 5F illustrate examples of a picked-up image of an alignment mark. In the past, an image within a broken line range 113 as shown in FIG. 5B has been defined as a registration image 114. In the conventional technique, when only part of an alignment mark 111 (or 112) to be registered can be seen with the eye as shown in FIG. 5E or 5F, detection of the alignment mark sometimes becomes impossible. The reason is that the alignment mark is considered as being detected when an alignment mark image coincidence at a prescribed rate with the registration image 114 is recognized (For example, in a manner such as a pattern matching method, a similarity concerning the luminance in a pixel to the registration image 114 is more than 60%.). In the event that the alignment mark cannot be detected at all or only a part of the alignment mark can be detected, the detection apparatus presupposes that the alignment mark exists in the neighborhood and begins to search the neighborhood centered on the part, for example, such as a spiral search, continuing the search until the alignment mark having a shape coincident with the registration image 114 can be found out. Disadvantageously, this work consumes much search time.

One of the causes of making the detection of an alignment mark impossible is that a plurality of objective lenses having different magnifications are used. More particularly, an objective lens of low magnification may be used for detection of the alignment mark but a spot to be inspected in an inspected subject (for example, a line width of a circuit pattern) has a size very smaller than that of the alignment mark and therefore gradual switching to an inspection objective lens of higher magnification is necessary. In addition, the objective lens of high magnification must be exchanged. If the magnification of objective lens is chosen erroneously, much time is required for correct detection of the alignment mark and as a whole, the search time is increased.

An object of the present invention is to solve the above problems and to provide position detection method and apparatus which can detect the position of an alignment mark by searching an image of at least a partial of the alignment mark.

To accomplish the above object, in a method of recognizing an inspection reference position on a subject to be inspected according to the invention, a position of an alignment mark can advantageously be detected by recognizing only part of a picked-up image of the alignment mark. Further, without changing the magnification of a microscope, the range of detection of the alignment mark is substantially expanded to advantage. This prevents the alignment mark on an inspection subject substrate from being undetectable. For the purpose of expanding the detectable range of the alignment mark, not only a substantially central pattern or a whole pattern of the alignment mark is registered but also peripheral characteristic patterns or a partial characteristic pattern are registered, respectively.

More specifically, according to one aspect of a position recognition method according to the invention, in an inspection apparatus such as an automatic line width measuring apparatus, an image of substantially the whole of an alignment mark is registered as a representative image and besides, at least one image of a part of the registered representative image is registered as a partial image. Then, by recognizing either the registered representative image or the partial image in a picked-up of image of a subject to be inspected, coordinates of a position of the alignment mark can be recognized.

Also, according to another aspect of a position recognition method according to the invention, in an inspection apparatus such as an automatic line width measuring apparatus for performing measurement by acquiring an image enlarged through the medium of a microscope, an image of a pattern substantially at a central portion of an alignment mark is registered as a representative image and besides, at least one image of a pattern at the periphery of the alignment mark is registered as a partial image. Then, by recognizing either the registered representative image or the partial image from a picked-up image of a subject to be inspected, the alignment mark is prevented from being undetectable without changing the detection range of the alignment mark through the magnification of the microscope, that is, by keeping an inspection objective lens of high magnification in use.

Further, according to still another aspect of a position recognition method according to the invention, the present invention can also be used for inspection of a line width on a substrate. Generally, a line width inspecting apparatus inspects a line width of a circuit pattern and therefore it often uses a technique of image recognition. The position recognition method of the invention can realize recognition of a position of an alignment mark by using a known technique similar to the image recognition used in the course of inspection of line widths. Accordingly, new hardware need not be added only for recognition of the alignment mark.

Further, as described previously, the conventional position recognition apparatus uses a mechanism for conducting search until an image of the whole of an alignment mark is found in the event that the alignment mark is not found. On the other hand, since in the present invention the position of the alignment mark can be detected by merely recognizing part of an image of the alignment mark, the range of position recognition can be expanded substantially. Accordingly, the mechanism of conventional technique as above can be dispensed with.

Other objects, features and advantages of the invention will become apparent from the following description of the embodiments of the invention taken in conjunction with the accompanying drawings.

DETAILED DESCRIPTION OF THE EMBODIMENTS

Embodiments of position recognition method and apparatus for recognizing an inspection reference position on a subject to be inspected according to the invention will now be described. An example in which the invention is applied to a line width measuring apparatus will be described hereinafter.

Figure 8:
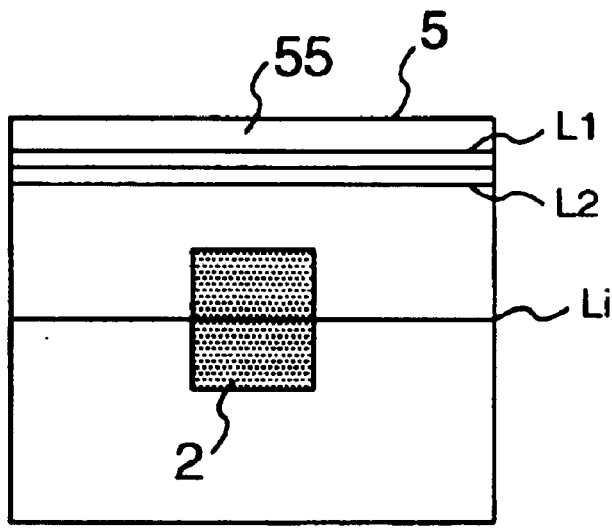
FIG. 8 is a diagram showing a conventional line width measuring method in the line width measuring apparatus.
Figure 9:
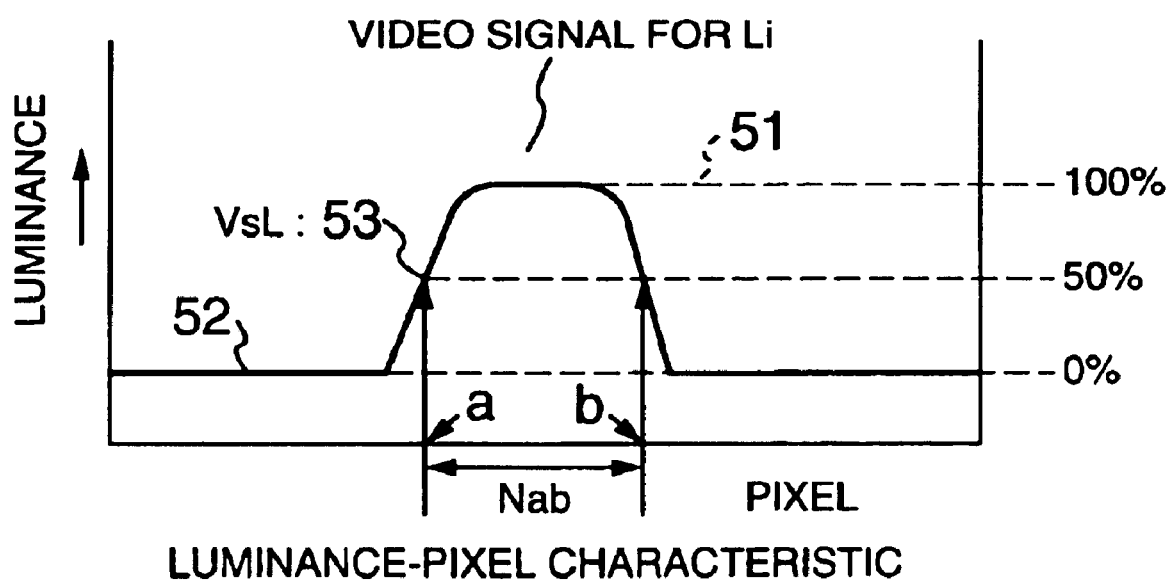
FIG. 9 is a graphic representation showing data obtained through the FIG. 8 line width measurement.

Referring to FIGS. 8 and 9, operation of the line width measuring apparatus will be described.

In a line width measurement apparatus, for example, a spatial image of an object to be measured projected by means of an optical microscope is picked up with a video camera (for example, a CCD camera), the size of a desired portion is electrically measured with a size measurement operation processing unit, and an image of the measured object and the measured size are displayed on a video monitor.

FIG. 8 is a diagram showing an example of a display on the screen of the video monitor during size measurement, where L1, L2 and Li indicate scanning lines, respectively. The luminance distribution on one horizontal scanning line Li in a monitor image 55 of a measured object picked up by means of the video camera, as shown in the figure, provides a luminance-pixel characteristic in accordance with luminance levels at individual pixel positions defined by N decomposing an image signal associated with the scanning line Li. The luminance-pixel characteristic is illustrated in FIG. 9. In the figure, ordinate represents luminance and abscissa represents pixel. In the conventional handling method, the size is obtained from this characteristic on the assumption that in the luminance distribution in FIG. 9, the maximum luminance level 51 is 100% and the minimum luminance level 52 is 0%. A positional difference Nab between a-th pixel and b-th pixel corresponding to a 50% luminance level VsL 53 is determined. This positional difference Nab is multiplied by a coefficient determined by a measuring magnification of the microscope and a measured object distance from the video camera to the measured object to determine a corresponding dimensional or size value X=K·Nab of the measured object. By the way, in above pixel-above luminance characteristic, the number of N may be equal to the number of the pixel.

The method for recognition of images as above is disclosed in, for example, U.S. Pat. No. 6,571,196 and is also called gray scale pattern matching.

Methods for registration and recognition of images in the present invention will now be described.

Figure 3:
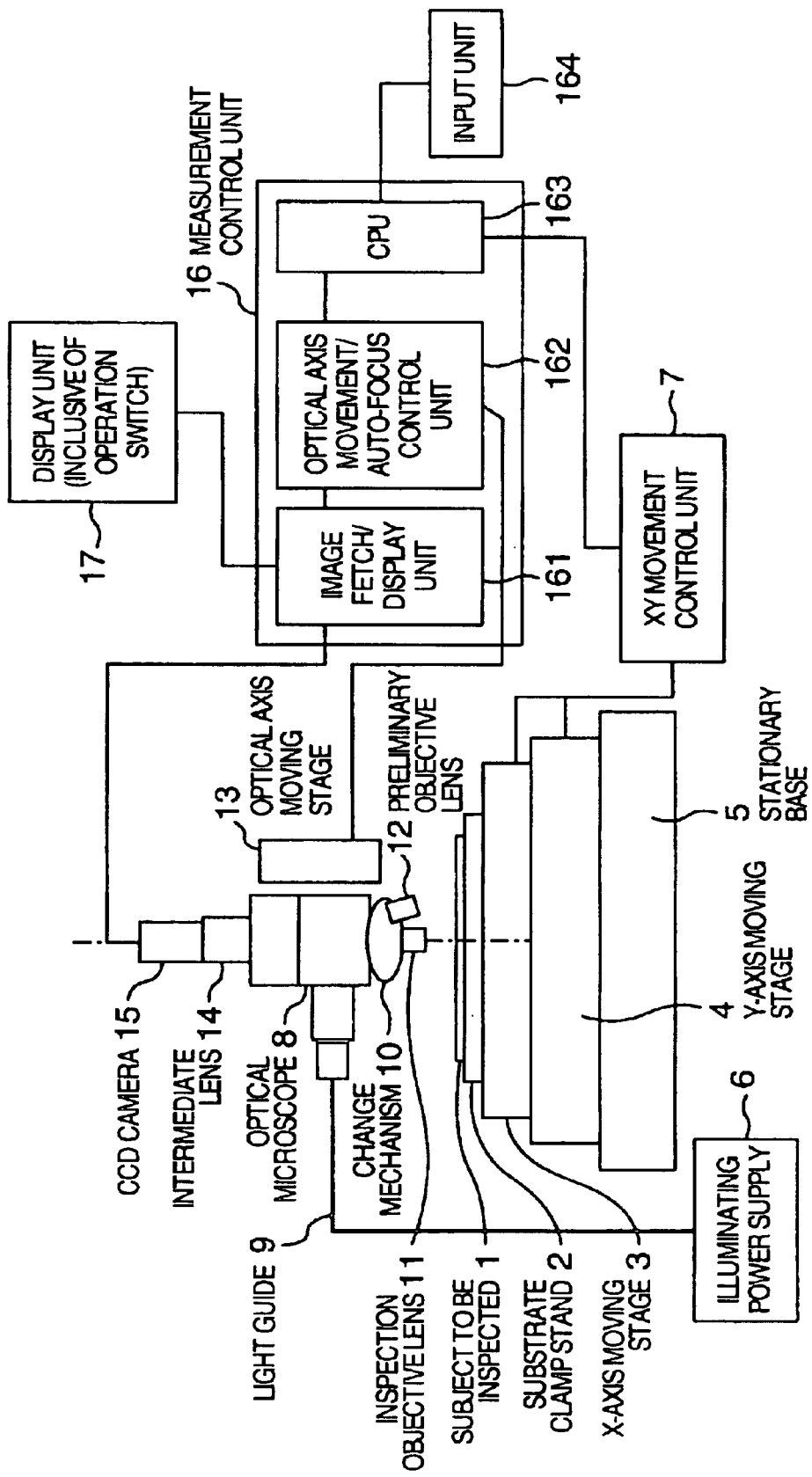
FIG. 3 is a block diagram showing an example of construction of a line width measuring apparatus.

FIG. 3 shows an example of construction of a line width measuring apparatus to which the invention is applied.

A subject to be inspected 1 is fixed to a substrate clamp stand (table) 2 by having its bottom adsorbed thereto. The substrate clamp stand 2 is carried on a Y-axis moving stage 4 and an X-axis moving stage 3 which are arranged on a stationary base 5. The inspected subject 1 can be moved on plane or two-dimensionally by moving the X-axis moving stage 3 and Y-axis moving stage 4 win X-axis and Y-axis directions via an XY movement control unit 7, respectively, so that a desired position inside the inspected subject 1 can be observed by means of an optical microscope 8. Each of the X-axis and Y-axis moving stages 3 and 4 can be operated manually by means of a measurement control unit 16 or in accordance with a program to be described later which is registered in advance in a CPU 163.

In FIG. 3, the inspected subject 1 is a substrate such as for example a semiconductor wafer, such an LCD (Liquid Crystal Device) or a PDP (Plasma Display Panel) for an FPD (Flat Panel Display). A spot to be inspected is an electrode pattern or a wiring pattern formed on the substrate such as a substrate wafer in the case of, for example, the automatic line width measuring apparatus, and a line width or a pattern interval of the pattern are measured.

Structurally, light from an illuminating power supply 6 is admitted to the optical microscope 8 through a light guide 9. The light is projected on the subject to be inspected 1 through the medium of an inspection objective lens 11. The projected light is reflected at the inspected subject 1 so as to be incident on a pick-up device (imaging unit) 15 by way of the inspection objective lens 11 and an intermediate lens 14. The pick-up device 15 converts the incident light into an electric signal which in turn is delivered to the measurement control unit 16. The pick-up device is, for example, a CCD camera capable of converting light rays such as visual light rays, infrared rays, ultraviolet rays or X rays into an electrical signal.

In a magnification change mechanism (revolver) 10, the inspection objective lens 11 is exchanged with an another inspection objective lens (a preliminary objective lens) 12 that an objective lens have a different magnification from that of the inspection objective lens 11. The inspection objective lens 11 is principally used for inspection of line widths. The preliminary objective lens 12, which magnification is lower magnification than the inspection objective lens 11, is mainly used for recognition of alignment marks. An optical axis (Z axis) moving stage 13 moves the whole of the optical microscope 8 amounted with the inspection objective lens 11 in the optical axis (Z-axis) direction for a focalization. The intermediate lens 14 is adapted to enlarge an image from the inspection objective lens 11 and project it upon the CCD camera 15. An image picked up by the CCD camera is inputted to an image fetch/display unit 161 inside the measurement control unit (inspection control unit) 16.

An optical axis (Z axis) movement/auto-focus control unit 162 is adapted to move the whole of the optical microscope 8 mounted with the inspection objective lens 11 in the optical axis (Z axis) for a focalization. The CPU 163 builds the program for executing a whole of the control. A video monitor 17 representing a display unit displays images of inspection spots and alignment marks as well as operation switches working on a GUI environment.

Figure 4:
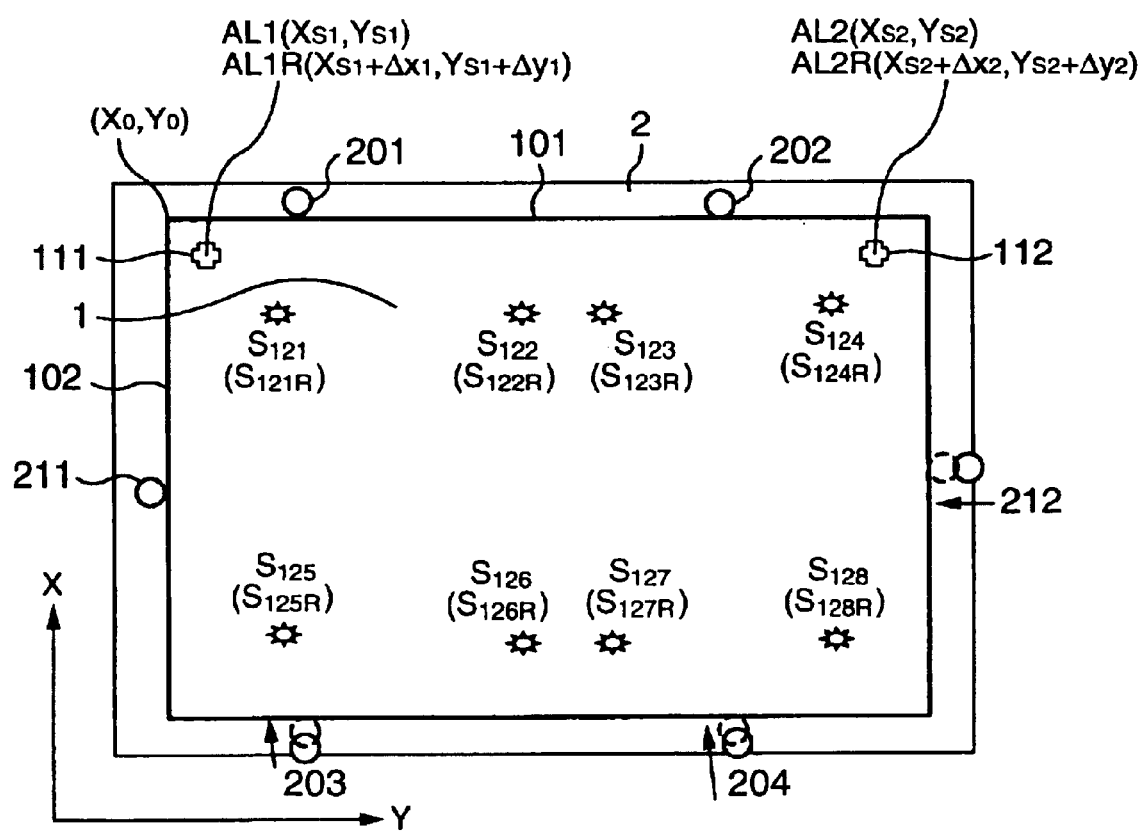
FIG. 4 is a diagram for explaining a subject to be inspected and the positional relation thereon.

A method of registering inspection position coordinates will be described by making reference to inspection position coordinates of the inspected subject 1, that is, coordinates of positions of inspection spots as shown in FIG. 4. In connection with FIG. 4, a description will be given by way of example of the inspected subject 1 which is made a choice in a substrate 1 at random.

In the inspection apparatus such as the automatic line width measuring apparatus, each a measurement value or a design value in the inspection spots $S_{121}$ to $S_{128}$ desired to be inspected on the substrate 1 are registered in advance in relation to reference position coordinates of X-direction reference plane 101 and Y-direction reference plane 102 of the substrate 1 and when inspecting the substrate representing the subject to be inspected 1, the precedently registered position coordinates are read sequentially and line widths of inspected spots are inspected at the registered coordinates. Here, starting point (the reference coordinates) in the substrate to be inspected may be out of alignment although the registered substrate is set again in the same apparatus. Thereby the correction of the inspection points to the reference coordinates is required when the inspection is executed in each case. By the way, an upper left corner is reference coordinates $(X_0, Y_0)$ in the FIG. 4. The detailed description is explained as follows.

Firstly, a sheet of desired substrate to be inspected is chosen and coordinates of alignment marks and individual inspection coordinates are registered in accordance with the following procedure. This inspection substrate may be a standard substrate prepared in advance or one substrate arbitrarily chosen from individual production lots.

In this example, a substrate having two alignment marks on the right and left sides will be described but the invention can also be applied to a substrate provided with a desired number of alignment marks.

In other words, a set-up position of substrate 1 relative to the X-direction reference plane 101 and Y-direction reference plane 102 is fixedly set by bringing the substrate 1 into contact with X-direction fixing roller 201, X-direction fixing roller 202 and Y-direction fixing roller 211. Then, X-direction flush roller 203 and 204 and Y-direction flush roller 212 are used to push the substrate in accordance with the allow direction, respectively. the X-direction fixing roller 201, X-direction fixing roller 202 and Y-direction fixing roller 211.

Under this condition, the substrate 1 is held by having its bottom adsorbed and thereafter, the X-direction flush roller 203, X-direction flush roller 204 and Y-direction flush roller 212 are released from their pushing against the substrate. The X-direction fixing roller 201, X-direction fixing roller 202 and Y-direction fixing roller 211 are fixable or escapable outwards but they are held by force withstanding that of the flush rollers 203, 204 and 212.

Under this condition, positions of left-side alignment mark 111 and right-side alignment mark 112 are observed through the inspection objective lens 11 and coordinates of the respective alignment marks 111 and 112 in terms of XY coordinates on detection-side XY stages and detected images are registered by means of the CPU 163.

Next, position coordinates desired to be inspected (position coordinates of inspected spots) 121 to 128 are registered similarly to those of the aforementioned left-side alignment mark 111 and right-side alignment mark 112 in accordance with the following procedure.

For example, distances of the left-side alignment mark 111 from the X-direction reference plane 101 and Y-direction reference plane 102 of the substrate, respectively, are of a tolerance of within ±0.1 mm and similarly, distances of the right-side alignment mark 112 from these planes 101 and 102, respectively, are of the same tolerance. When an inspection objective lens 11 of 5-power (5-times) magnification is used in an optical microscope having an intermediate lens 14 of 3.3-power magnification, the optical magnification is 5×3.3=16.5-power.

With a CCD camera 15 of a 6 mm-quare CCD camera size used, the view field for the CCD camera 15 is in the range of 6 mm÷16.5-power=0.36 mm. Therefore, the error of the distances of the respective left-side alignment mark 111 and right-side alignment mark 112 from the X- and Y-direction reference planes 101 and 102 is the ±0.1 mm, respectively, thereby it can be covered by a position recognition based on image processing.

After the alignment mark and the inspection position coordinates is registered, the substrate 1 is brought from the substrate claim 2 back to the storage area. The substrate to be inspected is set on the substrate clamp 2. The imaging unit images a predetermined position in the substrate. The signal processing unit processes an video signal from the imaging unit. The storage unit stores the video signal data. The control unit control the action of the table. The alignment mark is detected by the image processing. The different information (an offset and a gradient) between the detected position and the registered position of alignment mark is calculated. The position coordinates for inspection position is corrected. Then, the inspection is performed.

That is, as to the substrate to be inspected, after the left-side alignment mark 111 and right-side alignment mark 112 have been detected, inclination and offset on the substrate 1 are recalculated. Movement from position coordinate values of locations desired to be inspected (inspection spots) $S_{121}$ to $S_{128}$ to corrected position coordinates of inspection spots $S_{121}$ to $S_{128}$ (hereinafter termed inspection position coordinates) can be effected within an error of several of micrometers inherent in each of the X-axis moving stage 3 and Y-axis moving stage 4. Namely, an inspection objective lens 11 having a magnification of 50-power can be used. In this case, the view field is 6 mm÷(50-power×3.3-power)=36 micrometers. The each error is in a range of a few micrometers. Accordingly, an accurate inspection can be carried out because the inspection points is surely within the range of 36 micrometers view field.

Next, methods for image registration and image detection of the right-side alignment mark 111 and left-side alignment mark 112 will be described more specifically with reference to FIGS. 1B to 1G and FIGS. 5A to 5F.

(1) Image Registration Method

Firstly, a method of registering a representative image (here, an image of central portion) of an alignment mark image will be described.

With the XY movement control unit 7 operated (this operation is called XY remote), the left-side alignment mark 111 on the substrate 1 is moved by using the X-axis movement stage 3 and Y-axis movement stage 4 so that the mark 111 is brought into the pick-up view field of CCD camera 15, that is, the image of the alignment mark 111 is brought into the pick-up view field of the monitor screen of the video monitor 17.

Subsequently, with the optical axis movement/auto-focus control unit 162 operated manually (this operation is called Z manual remote), the Z-axis moving stage 13 is used to bring the optical system into focus.

In this manner, the left-side alignment mark 111 is placed in the center of the screen and picked up. Then, a broken line mark frame (an area surrounded by broken line) to be displayed on the screen during registration is selected by using an input unit, for example, a mouse for GUI (Graphical User Interface) operation. The broken line mark frame 113 is dragged by means of the mouse so that the center of broken line mark frame 113 may be centered on the image of left-side alignment mark 111 and then, a registration button displayed on the screen (not shown) is pressed. Further, if it is desired that the size of the broken line mark frame 113 is changed, then the frame is dragged thereby the size of the broken line mark frame 113 is changed. In an alternative, the image may be selected through a method in which a frame is formed on the screen. Thus, an image within the broken line range 113 is registered as a registration image 114. The central portion of broken line range 113 corresponds to center coordinates of the registration image.

Thereafter, a position coordinate recognition button displayed on the screen of video monitor 17 during registration (not shown) is pressed to register center position coordinates (XY coordinates (X, Y)) of the alignment mark 111 as AL1 (X, Y)=($X_{s1}$, $Y_{s1}$). Here, ($X_s$, $Y_s$) are position coordinates referenced to reference coordinates ($X_0$, $Y_0$) of the FIG. 4 substrate and are XY stage coordinates.

Through the above processing, the central portion image of the alignment mark 111 is registered as a representative image.

Otherwise, an image of the whole of the alignment mark 111 (see FIG. 1G) may be registered as a representative image.

Figure 1A:
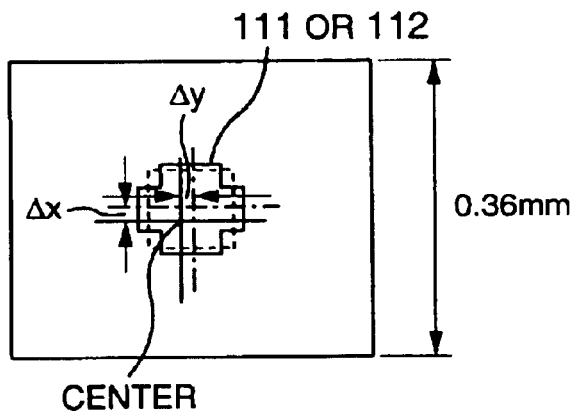
FIGS. 1A to 1G are diagrams for explaining an embodiment of the invention.
Figure 1B:
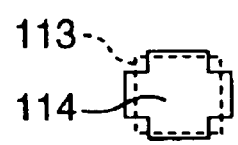
Figure 1C:
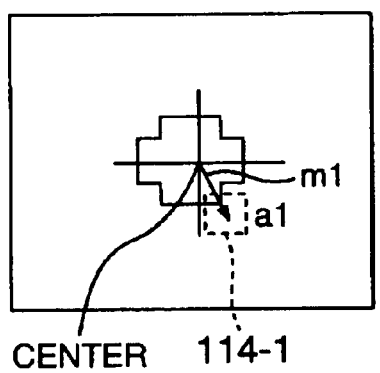
Figure 1D:
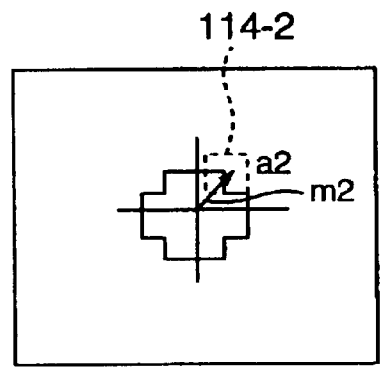
Figure 1E:
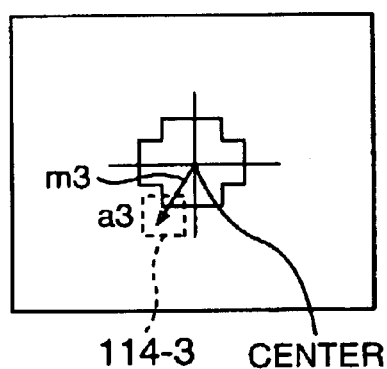
Figure 1F:
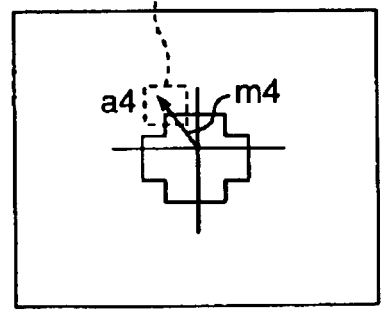
Figure 1G:
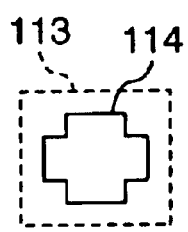
Figure 2A:
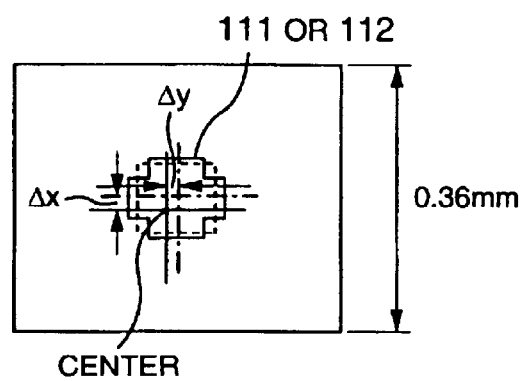
FIGS. 2A to 2F are diagrams also for explaining the embodiment of the invention.
Figure 2B:
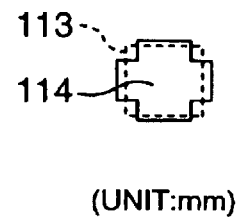
Figure 2C:
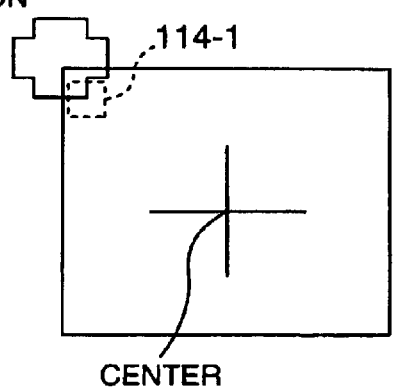
Figure 2D:
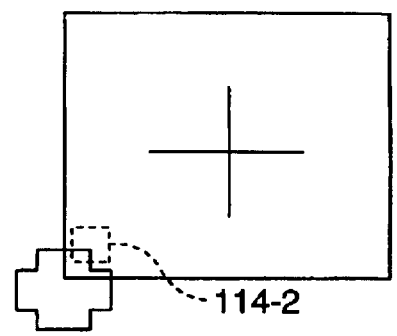
Figure 2E:
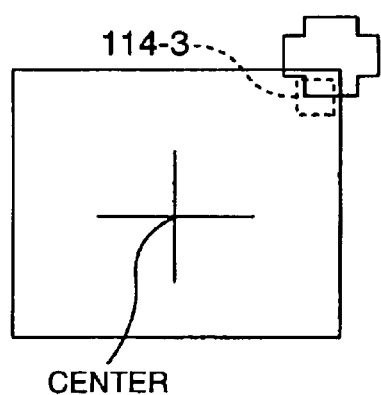
Figure 2F:
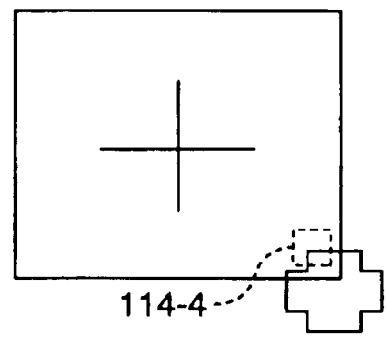

Next, as shown in FIG. 1C, the broken line mark frame 113 is so dragged as to coincide with a corner (for example, a right-below lower portion) of the alignment mark 111 and only a right-below image of the alignment mark 111 is registered similarly (within broken line frame in FIG. 1C). This registration image (partial image) is designated by 114-1. Subsequently, as shown in FIG. 1D, only a right-above image of the left-side alignment mark 111 is registered (within broken line frame in FIG. 1D). This registration image (partial image) is designated by 114-2. Next, as shown in FIG. 1E, only a left-below image of the left-side alignment mark 111 is registered. This registration image (partial image) is designated by 114-3 (within broken line frame in FIG. 1E). Thereafter, as shown in FIG. 1F, only a left-above image of the left-side alignment mark 111 is registered. This registration image (partial image) is designated by 114-4 (within broken lien frame in FIG. 1F).

Similarly, in connection with the right-side alignment mark 112, images (a representative image and partial images) similar to those in FIG. 1A and FIGS. 1C to 1F are also registered.

The right-side alignment mark 112 is registered in a manner similar to the above. Then, center position coordinates (XY coordinates (X, Y)) of the alignment mark 112 are registered as AL2 (X, Y)=($X_{s2}$, $Y_{s2}$).

Further, individual portions indicated by the broken line mark frame 113 are registered partially in a similar way. As in the case of the previously-described alignment marks, coordinates of positions of individual detection spots are registered. Namely, after movement to the vicinity of a detection spot and focusing are effected through the manual remote operation, the mark (not shown) displayed on the screen during registration is dragged by means of the mouse so as to coincide with the detection spot and then, the position coordinate recognition button (not shown) displayed on the screen during registration is pressed. This causes coordinates at the mark position to be set as registered position coordinates. In order of registration, inspection position coordinates $S_{121}$ ($X_{121}$, $Y_{121}$), $S_{122}$ ($X_{122}$, $Y_{122}$), . . . , $S_{128}$ ($X_{128}$, $Y_{128}$) as shown in FIG. 4, for instance, are registered. By the way, if the pattern of the right-side alignment mark 112 is similar to the pattern of the left-side alignment mark 111, it might be the step of registering the image can be omitted and only the position thereof might be registered.

(2) Image Detection Method

Next, a method of detecting images at the individual inspection spots will be described.

Firstly, the X-direction reference plane fixing roller 201, X-direction reference plane fixing roller 202 and Y-direction reference plane fixing roller 211 for the substrate 1 are moved to constant positions and then the substrate 1 is pushed thereagainst by means of the X-direction flush roller 203, X-direction flush roller 204 and Y-direction flush roller 212.

Subsequently, the substrate 1 is held through adsorbing. Thereafter, the X-direction flush roller 203, X-direction flush roller 204 and Y-direction flush roller 212 are released from being pushed against the substrate 1. In addition, the fixing rollers 201 and 202 on the substrate reference plane side and the Y-direction reference plane fixing roller 211 are escaped by being moved to constant positions.

At the alignment mark position coordinate AL1 (X,Y), the whole of the screen is brought into focus.

Figure 5A:
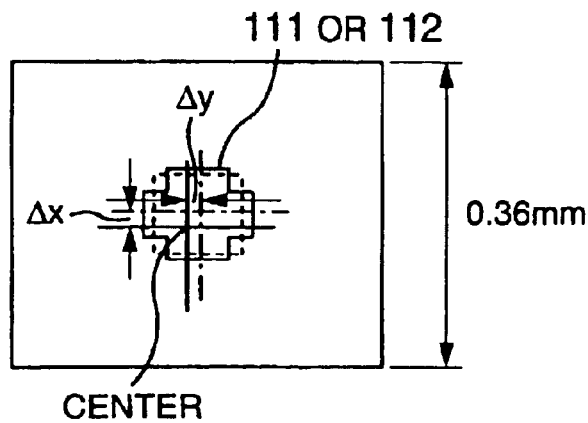
FIGS. 5A to 5F are diagrams for explaining methods of registering and detecting images of an alignment mark.
Figure 5B:
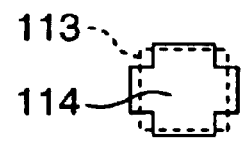
Figure 5C:
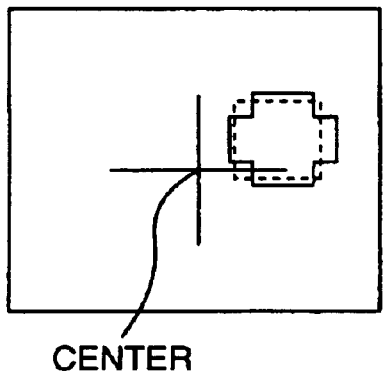

Because of the dimensional errors of the substrate 1, an registered position may be out of the alignment from the center position coordinate, for example, as shown in FIG. 5C. In such a case, drift correction as below is made. Firstly, this image is recognized to obtain the AL1R($X_1$,$Y_1$) as the left-side alignment mark position coordinate on the inspection object substrate.

Figure 5D:
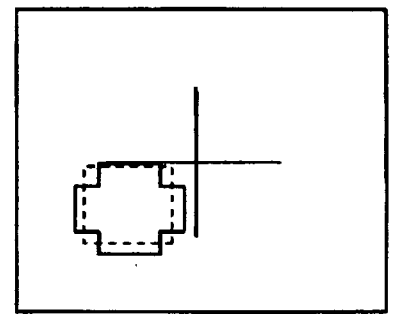
Figure 5E:
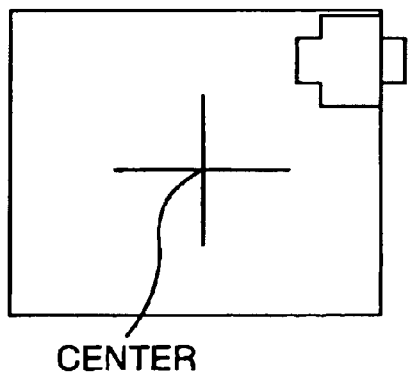
Figure 5F:
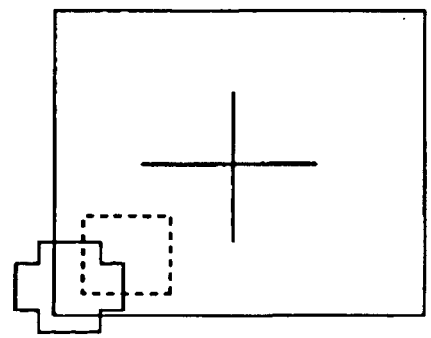

Further, when the overall screen is brought into focus at the alignment mark coordinate position AL2 (X,Y), an image of the alignment mark will sometimes be obtained which is displaced within the tolerance of the substrate 1 as shown in FIG. 5D, for instance. This image is recognized to obtain AL2R ($X_2$,$Y_2$) as the right-side alignment mark position coordinate.

From AL1R and AL2R, inclination θR and offset OFR (X,Y), to be described later, associated with position coordinates of registered images are determined.

For example, inclinations of the inspection position coordinates $S_{121}$ ($X_{121}$, $Y_{121}$), $S_{122}$ ($X_{122}$, $Y_{122}$), . . . , $S_{128}$($X_{128}$, $Y_{128}$) registered with 0 (zero) inclination and 0 offset are corrected by the previously determined θR and offset OFR (X,Y) to calculate corrected inspection position coordinates $S_{121R}(X_{121R}, Y_{121R})$, $S_{122R}(X_{122R}, Y_{122R})$, ..., $S_{128R}(X_{128R}, Y_{128R})$. It moves to the inspection spot to inspect it on the basis of the determined inspection position.

Next, an inspection spot at the inspection position $S_{122R}$ is inspected and similarly, all inspection spots are sequentially inspected up to an inspection spot at the inspection position $S_{128R}$.

As described in connection with the image registration method, the substrate 1 is fixedly mounted to the substrate clamp stand 2 through the use of the fixing rollers 201, 202 and 211 and the flush rollers 203, 204 and 212 and then held through adsorbing.

Subsequently, movement to the left-side alignment mark registration position coordinates AL1 (X,Y) is effected and then the overall screen is brought into focus through autofocusing.

It is now assumed that an image of alignment mark is obtained which is displaced from the center of the screen as shown in the drawing of FIG. 5C, for instance, owing to irregularities in substrate 1. In this situation, it will be considered that either images as shown in FIGS. 2A, 2C, 2D, 2E and 2F are detected or any alignment mark is not detected at all (not shown). In the present invention, the partial image is registered in addition to the aforementioned representative image in such an event. Therefore, even when only part of the alignment mark is in the view field, the alignment mark can be detected.

Figure 7:
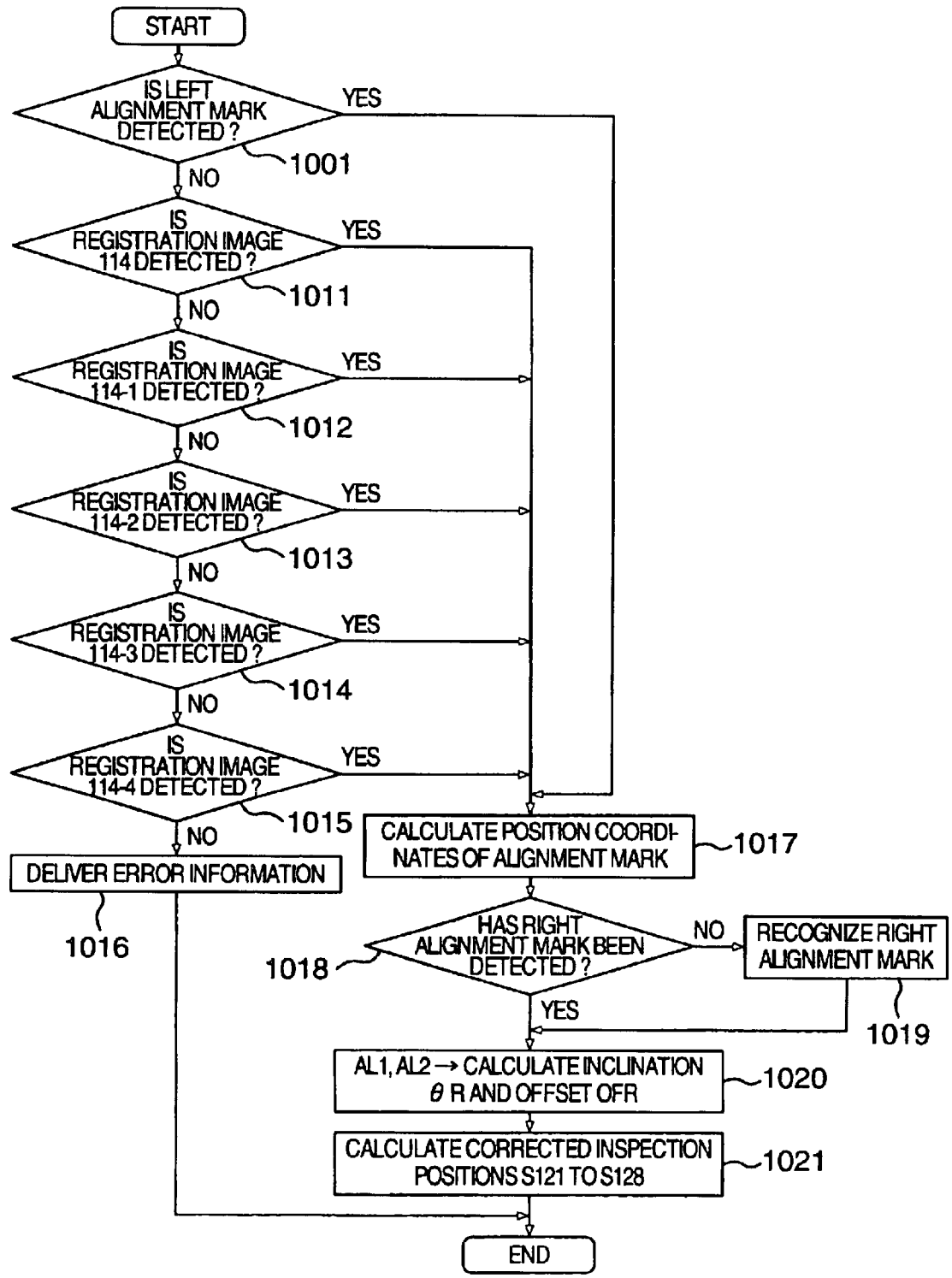
FIG. 7 is a flow chart showing a process according to an embodiment of a position recognition method of the invention.

The detection method will further be described in greater detail by making reference to images of FIGS. 2A to 2F and a flowchart of FIG. 7. The flowchart of FIG. 7 shows a process in an embodiment of the position recognition method according to the invention and is executed in accordance with a program in the CPU 163.

The step 1001 determines whether or not it finishes to recognize the left-side alignment mark. If it is finished, the program proceeds to the step 1017. If it is not finished, the program proceeds to the step 1011. Next, an image of the left-side alignment mark is recognized initially. Here, the gray scale pattern matching disclosed in U.S. Pat. No. 6,571,196, for example, is used as the alignment mark recognition method.

The procedure to obtain the coordinates of the left-side alignment mark 111 will be described by using of the following step 1011–1017.

In step 1011, it is decided whether or not the whole of an image 114 of the alignment mark is detected. If the whole is detected, position coordinates are recognized with the image 114 (position coordinates AL1 (X,Y) are obtained) and the left-side alignment mark detection process ends. If the image 114 of the alignment mark is detected, the program proceeds to step 1017. If the image 114 of the alignment mark is not detected, the program proceeds to step 1012.

Similar steps proceed subsequently. More particularly, in the step 1012, it is decided whether or not an image 114-1 of the alignment mark is detected. If the image 114-1 is detected, position coordinates are recognized with the image 114-1 (position coordinates AL1 (X,Y) are obtained) and the left-side alignment mark detection process ends. If the image 114-1 of the alignment mark is detected, the program proceeds to step 1017. If the image 114-1 of the alignment mark is not detected, the program proceeds to step 1013.

In the step 1013, it is decided whether an image 114-2 of the alignment mark is detected. With the image 114-2 detected, position coordinates are recognized with the image 114-2 (position coordinates AL1 (X,Y) are obtained) and the left-side alignment mark detection process ends. If the image 114-2 of the alignment mark is detected, the program proceeds to step 1017. If the image 114-2 is not detected, the program proceeds to step 1014.

In the step 1014, it is decided whether an image 114-3 of the alignment mark is detected. With the image 114-3 detected, position coordinates are recognized with the image 114-3 (position coordinates AL1 (X,Y) are obtained) and the left-side alignment mark detection process ends. If the image 114-3 of the alignment mark is detected, the program proceeds to step 1017. If the image 114-3 of the alignment mark is not detected, the program proceeds to step 1015.

In the step 1015, it is decided whether an image 114-4 of the alignment mark is detected. With the image 114-4 detected, position coordinates are recognized with the image 114-4 (position coordinates AL1 (X,Y) are obtained) and the left-side alignment mark detection process ends. If the image 114-4 of the alignment mark is detected, the program proceeds to step 1017. If the image 114-4 of the alignment mark is not detected and so the detection fails, the program proceeds to step 1016.

In the step 1016, the failure of the left-side alignment mark detection is informed to an operator by displaying an alarm on the monitor screen or by delivering an alarm sound and the process is interrupted. Through this step, a user is informed that the alignment mark does not exist in the range of constant error. In this case, the alignment mark can also be determined not to be in the range of inspection standards. Namely, this substrate can be detected as a defective one.

In step 1017, the position coordinate is recognized from the detected image (any one of the images 114, 114-1, 114-2, 114-3 and 114-4). (That is, a position coordinate AL1 (X,Y) is obtained.) And then, the program proceeds to step 1018, the process of the recognition of the next right-side alignment mark.

Next, the right-side alignment mark is recognized similarly to obtain position coordinates AL2 (X,Y). Thus, in step 1018, it is decided whether position coordinates of both the alignment marks on both the left side and the right side are calculated. In case position coordinates of the right-side alignment mark are not calculated, a process similar to that in step 1001 is carried out in step 1019 to recognize the right-side alignment mark. Subsequently, the right-side alignment mark is recognized and detected in a manner described as above to calculate position coordinates.

Through the above recognition work, actual positions of the left-side and right-side alignment marks on the substrate can be recognized. Thus, a relative coordinate difference of the substrate of interest from the substrate initially registered can be known. Therefore, on the basis of the coordinate difference, positions of the individual inspection coordinates can be calculated. For example, from the position coordinates AL1 (X,Y) and the position coordinates AL2 (X,Y), the inclination θR and offset OFR(X,Y) are determined. Here, the inclination θR indicates a gradient between AL1 (X,Y) and AL2 (X,Y) and the offset OFR(X,Y) indicates a difference between the AL1 (X,Y) and the registered coordinates (Step 1020).

The inspection positions $S_{121}(X_{121}, Y_{121})$, $S_{122}(X_{122}, Y_{122})$, ..., $S_{128}(X_{128}, Y_{128})$ registered with the inclination set to 0 and the offset set to 0 during registration are corrected with the inclination θR and offset OFR(X,Y) to calculate corrected inspection position coordinates $S_{121R}(X_{121R}, Y_{121R})$, $S_{122R}(X_{122R}, Y_{122R})$, ..., $S_{128R}(X_{128R}, Y_{128R})$ (Step 1021).

Thereafter, an inspection spot on a corrected proper inspection position $S_{121}(X_{121}, Y_{121})$ is detected.

Subsequently, an inspection spot on a corrected right $S_{122}$ $(X_{122}, Y_{122})$ is inspected and the inspection proceeds similarly up to an inspection spot on an inspection position $S_{128}$.

Next, how much the alignment mark detection range can be improved according to the invention will be verified.

Figure 6A:
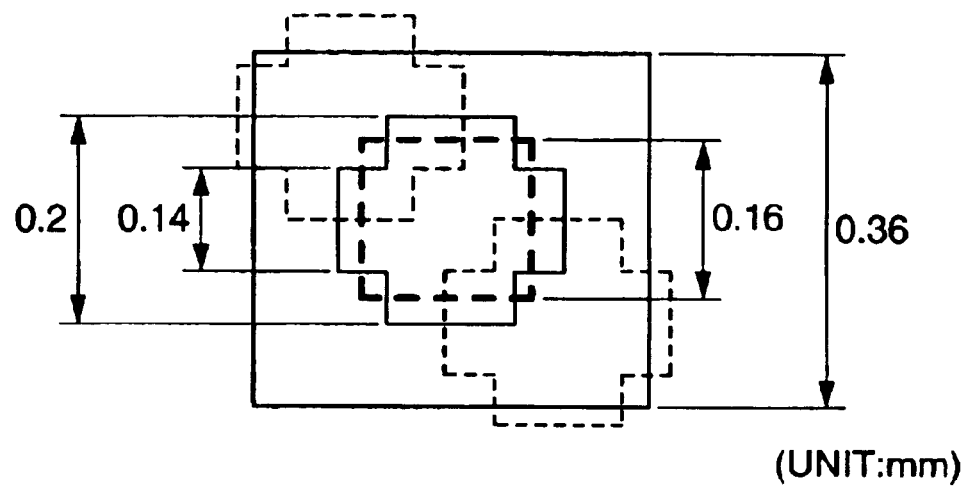
FIGS. 6A to 6B are diagrams for explaining the difference between the range of recognition of an alignment mark of the prior art (FIG. 6A) and that of the present invention (FIG. 6B).

Firstly, in the conventional detection range as shown in FIG. 6A, screen view field is 0.36 mm, and alignment mark detection range is 0.16 mm, so that the detectable range is, $$\text{detectable range} = \text{screen view field} - \text{detection range}$$

$$= 0.36 - 0.16$$

$$= 0.2 \text{ mm.}$$

Figure 6B:
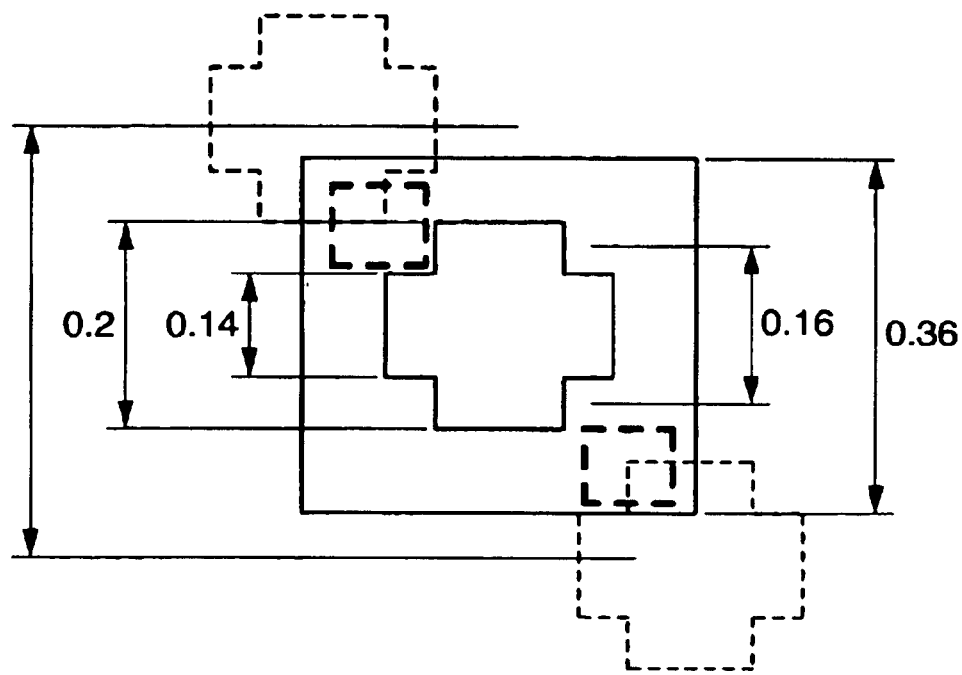

In the detection range of the invention as shown in FIG. 6B, screen view field is 0.36 mm, and alignment mark detectable range: 0.15 mm, so that the detectable range is, $$\text{detectable range} = \text{screen view field} + \text{detection range}$$

$$= 0.36 + 0.15$$

$$= 0.51 \text{ mm.}$$

Accordingly, by practicing the present invention, the detectable range in one direction changes from 0.2 mm to 0.51 mm and is therefore about 2.5 times expanded.

Conventionally, the wider the alignment mark detection range (indicating that the alignment mark is wider), the detectable range becomes narrower but in the present invention, the wider the alignment mark detection range, the alignment mark detectable range becomes wider (indicating that the alignment mark is wider), ensuring that the detectable range can advantageously be expanded.

Further, the objective lens used for recognition of images of the alignment mark can be used at as high a magnification as possible (2.5-power is not used to widen the view field but 5-power can be used to expand the detection range) and therefore, errors in recognition of the XY position of the alignment mark can be reduced, bringing about an advantage that when the magnification shifts to a further higher inspection magnification (50-power), the errors in XY position recognition can be reduced further to advantage.

The depth of focus of the objective lens is, 100 micrometers at 2.5-power inspection magnification, 20 micrometers at 5-power inspection magnification and 1 micrometers at 50-power inspection magnification.

At the 2.5-power inspection magnification, the focus (center coordinates) must be detected within a range of 100 micrometers. But when the inspection magnification is shifted from 2.5-power to 50-power, the focus of the alignment mark can sufficiently be detected in the range of 20 micrometers. Accordingly, the time for detecting the focus of the alignment mark can be reduced by a reduction in the range of focus detection.

In the foregoing embodiments, the operator is loaded with registration work five times per registration work of one alignment mark. To solve this inconvenience, an area may be set in advance to permit automatic recognition to proceed.

An example of the method for this purpose will be described with reference to FIGS. 1C to 1F.

Firstly, moving distances m1 to m4 and area ranges a1 to a4 are determined. Then, by merely designating a registration image of the whole (representative image) 114, other 4 points can be registered automatically. In other words, the procedures as below are carried out.

(1) A registration image (partial image) 114-1 is moved right below by a predetermined distance m1 and the area is set to a predetermined range a1. Similar procedure is repeated subsequently.

(2) A registration image (partial image) 114-2 is moved right above by m2 and the area is set to a2.

(3) A registration image (partial image) 114-3 is moved left below by m3 and the area is set to a3.

(4) A registration image (partial image) 114-4 is moved left above by m4 and the area is set to a4.

It is to be noted that m1 to m4 represent arbitrary lengths and they may be equal to each other.

The representative image and the partial image can be set arbitrarily in number and the moving distance and area range may be set in correspondence with the individual registration images 114-1 to 114-4.

Further, for reduction of labor and time of registration, registration data of a plurality of images may be stored in a medium such as a floppy disk and may be read as necessary.

As described above, according to the invention, by registering the partial image indicative of part of the representative image in addition to the representative image, the detection range can be widened to a great extent.

Further, even for a large alignment mark, the detectable range can be expanded.

Furthermore, an objective lens having as high a magnification as possible can be used for recognition of an alignment mark image. By shifting the inspection magnification to a higher one, the XY position recognition error can be reduced.

Furthermore, the depth of focus of the objective lens is required to permit focus detection over a wide range when the magnification of the objective lens is shifted to higher one but the focus detection can sufficiently be effected in a range narrower than that in the prior art, thereby making it possible to reduce the time for focus detection.

Moreover, it is general that the preliminary objective lens of low magnification needs to be used for recognition of the alignment mark and the inspection objective lens of high magnification must be used for inspection of a subject to be inspected.

In the past, the alignment mark is recognized by using the preliminary objective lens of low magnification and thereafter, the lens must be changed to the inspection objective lens of high magnification to inspect an inspection point (for example, a line width) of a subject to be inspected. In the present invention, however, an alignment mark can be recognized using only the inspection objective lens of high magnification (for inspection of a subject to be inspected). As soon as the alignment mark has been recognized, a line width representing the subject to be inspected can be inspected without changing the magnification of the objective lens, in contrast to the prior art. Accordingly, the time required for inspection can be shortened to a great extent.

The position recognition method of this invention has been described by way of the line width measuring apparatus but can also be applied to other apparatus (for example, semiconductor stepper apparatus).

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An method of detecting a pattern in a pattern detecting apparatus, the apparatus comprising a table for fixing a substrate having a formed wiring pattern and an alignment mark, an imaging unit which images a predetermined point in said substrate, a signal processing unit which processes a video signal send by said imaging unit and a control unit which controls the action of said table, the method comprising steps of:

imaging a first alignment mark as a reference by said imaging unit;

registering a substantially whole alignment mark in said imaged first alignment mark and a part of alignment mark in said imaged first alignment mark;

imaging a second alignment mark in said substrate to be inspected by said imaging unit; and detecting a position of said second mark from said imaged second alignment mark, based on any of said substantially whole alignment mark or at least a part of said imaged first alignment mark.

2. The method of detecting a pattern according to the claim 1, further comprising:

imaging a third alignment mark which position is different from said first alignment mark, as a reference, imaged by said imaging unit; and registering a substantially whole alignment mark in said third imaged alignment mark and a part of said third image alignment mark.

3. The method of detecting a pattern according to the claim 2, further comprising:

by said imaging unit, imaging a fourth alignment mark which position is different from said second alignment mark;

detecting a position of said fourth alignment mark from said imaged fourth alignment mark based on any of a substantially whole alignment mark in said imaged third alignment mark or at least a part of said imaged third alignment mark.

4. The method of detecting a pattern according to the claim 3, wherein said signal processing unit calculates an offset and a gradient to be measured, based on a result of said position detection in said second and said fourth alignment mark, and corrects said positions of said second and said fourth alignment mark, based on said offset and said gradient.

5. The method of detecting a pattern according to the claim 1, wherein, in said detecting step, said signal processing unit outputs an error information if said second alignment mark is not detected from any images of said first alignment marks.

6. The method of detecting a pattern according to the claim 1, wherein said detecting is performed by using of a gray scale pattern matching.

7. The method of detecting a pattern according to claim 1, wherein said imaging unit further comprises a first optical system and a second optical system, said each optical system has a different magnification, respectively, said wiring pattern is imaged by said second optical system.

8. An apparatus which detects a pattern comprises:

a table which fixes a substrate which includes an alignment mark, a wiring pattern being formed on said substrate;

an imaging unit which images a predetermined position on said substrate;

a storage unit which stores an video data; and a control unit which adjusts a range of view to be imaged by said imaging unit so as to a predetermined position in said substrate fixed on said table, wherein said imaging unit images a first alignment mark, as a reference, imaged by said imaging unit and a second alignment mark to be measured and registers substantially whole alignment mark of said imaged first alignment mark to said storage unit and a part of alignment mark in said first alignment mark; and wherein said signal processing unit has a function for detecting a position of said second alignment mark from said imaged second alignment mark based on any of a substantially whole alignment mark of said registered first alignment mark or at least a part of said imaged first alignment mark.

9. The apparatus which detects the pattern according to the claim 8, wherein said control unit which adjusts said range of view moves said substrate as a reference;

wherein said imaging unit has a function for imaging a third alignment mark which is different from said first alignment mark as a reference; and wherein said substantially whole alignment mark of said imaged third alignment mark and a part of said imaged third alignment mark are registered.

10. The apparatus which detects a pattern according to the claim 9, wherein said imaging unit has a function for imaging a fourth alignment mark which is different from said second alignment mark to be measured; and wherein said signal processing unit has a function for detecting a position of said fourth alignment mark from said fourth alignment mark, based on a substantially whole alignment mark of said third alignment mark registered by said storage unit and at least a part of said imaged third alignment mark.

11. The apparatus which detects a pattern according to the claim 10, wherein said signal processing unit calculates an offset and a gradient to be measured, based on a result of said position detection in said second and said fourth alignment mark, and corrects positions of said second and said fourth alignment mark, based on said offset and said gradient.

12. The apparatus which detects a pattern according to the claim 8, wherein, in the case of detecting a position of said second mark from said imaged second alignment mark, based on any of said substantially whole alignment mark or at least a part of said imaged first alignment mark, said signal processing unit outputs an error information if said second alignment mark is not detected from any of said first alignment marks.

13. The apparatus which detects a pattern according to the claim 8, wherein, in the case of detecting a position of said second mark from said imaged second alignment mark, based on any of said substantially whole alignment mark or at least a part of said imaged first alignment mark, said detecting is performed by using of a gray scale pattern matching.

14. The apparatus which detects a pattern according to the claim 8, wherein said imaging unit further comprises a first optical system and a second optical system, said each optical system has a different magnification, respectively, said wiring pattern is imaged by said second optical system.

15. The apparatus which detects a pattern according to the claim 8, wherein a magnification of said second optical system is larger than a magnification of said first optical system.

* * * * *